(12) United States Patent
Thirumalai et al.

(10) Patent No.: US 7,908,279 B1
(45) Date of Patent: Mar. 15, 2011

(54) FILTERING INVALID TOKENS FROM A DOCUMENT USING HIGH IDF TOKEN FILTERING

(75) Inventors: Srikanth Thirumalai, Clyde Hill, WA (US); Aswath Manoharan, Bellevue, WA (US); Mark J. Tomko, Seattle, WA (US); Grant M. Emery, Seattle, WA (US); Vijai Mohan, Bellevue, WA (US); Egidio Terra, Porto Alegre (BR)

(73) Assignee: Amazon Technologies, Inc., Reno, NV (US)

( * ) Notice: Subject to any disclaimer, the term of this patent is extended or adjusted under 35 U.S.C. 154(b) by 711 days.

(21) Appl. No.: 11/856,581

(22) Filed: Sep. 17, 2007

Related U.S. Application Data (60) Provisional application No. 60/940,367, filed on May 25, 2007.

(51) Int. Cl.
 *G06F 7/00* (2006.01)
 *G06F 17/30* (2006.01)
 *G06F 17/21* (2006.01)
 *G06F 9/445* (2006.01)

(52) U.S. Cl. .......... 707/749; 707/750; 707/754; 704/10; 717/174

(58) Field of Classification Search .................. 707/736, 707/748–750, 754; 704/10; 717/174
See application file for complete search history.

(56) References Cited

U.S. PATENT DOCUMENTS

| | | | |
|---|---|---|---|
| 4,849,898 A | 7/1989 | Adi | |
| 5,062,074 A | 10/1991 | Kleinberger | |
| 5,261,112 A | 11/1993 | Futatsugi | |
| 5,835,892 A | 11/1998 | Kanno | |
| 5,960,383 A | 9/1999 | Fleischer | |
| 6,038,561 A | 3/2000 | Snyder | |
| 6,075,896 A | 6/2000 | Tanaka | |
| 6,076,086 A | 6/2000 | Masuichi | |
| 6,167,398 A | 12/2000 | Wyard | |

(Continued)

FOREIGN PATENT DOCUMENTS

EP   1 380 966 A2   1/2004

OTHER PUBLICATIONS

Bilenko et al, 'Adaptive Name Matching in Information Integration', 2003, IEEE Computer Society, pp. 16-23.*

(Continued)

*Primary Examiner* — James Trujillo
*Assistant Examiner* — Cheryl M Shechtman
(74) *Attorney, Agent, or Firm* — Robert C. Kowert; Meyertons, Hood, Kivlin, Kowert & Goetzel, P.C.

(57) ABSTRACT

Systems and methods for filtering tokens from a document for determining whether the document describes substantially similar subject matter compared to another document are described. In one embodiment, a first document is obtained. This document is organized into a plurality of fields, and at least some of the fields include tokens representing the subject matter described by the document. A field of this document is selected and a token from within the selected field having the highest inverse document frequency (IDF) is selected. Those tokens that have a higher IDF than the selected token are removed. Using the remaining tokens, a determination is made as to whether the first document describes substantially similar subject matter to the subject matter described by a second document. An indication is provided as to whether the first document describes substantially similar subject matter to that described by a second document according to the determination.

25 Claims, 10 Drawing Sheets

U.S. PATENT DOCUMENTS

| | | |
|---|---|---|
| 6,173,251 B1 | 1/2001 | Ito |
| 6,263,121 B1 | 7/2001 | Melen |
| 6,606,744 B1 * | 8/2003 | Mikurak ............... 717/174 |
| 6,810,376 B1 | 10/2004 | Guan |
| 6,961,721 B2 * | 11/2005 | Chaudhuri et al. ........... 707/200 |
| 7,113,943 B2 | 9/2006 | Bradford |
| 7,346,839 B2 | 3/2008 | Acharya |
| 7,386,441 B2 | 6/2008 | Kempe |
| 7,426,507 B1 | 9/2008 | Patterson |
| 7,529,756 B1 * | 5/2009 | Haschart et al. ............ 707/102 |
| 7,562,088 B2 * | 7/2009 | Daga et al. ............. 707/101 |
| 7,567,959 B2 | 7/2009 | Patterson |
| 7,599,914 B2 | 10/2009 | Patterson |
| 7,603,345 B2 | 10/2009 | Patterson |
| 2002/0016787 A1 | 2/2002 | Kanno |
| 2003/0065658 A1 | 4/2003 | Matsubayashi |
| 2003/0101177 A1 | 5/2003 | Matsubayashi |
| 2006/0112128 A1 | 5/2006 | Brants |
| 2006/0282415 A1 | 12/2006 | Shibata |
| 2007/0067157 A1 * | 3/2007 | Kaku et al. ............... 704/10 |
| 2009/0119281 A1 * | 5/2009 | Wang et al. ............... 707/5 |
| 2009/0204609 A1 * | 8/2009 | Labrou et al. ............... 707/5 |

OTHER PUBLICATIONS

J. Ramos, 'Using TF-IDF to Determine Word Relevance in Document Queries', 2001, Citeseer, pp. 1-4.*

A. Kilgarriff, 'Using Word Frequency Lists to Measure Corpus Homogeneity and Similarity between Corpora', 1997, Citeseer, pp. 231-245.*

Conrad et al, 'Online Duplicate Document Detection: Signature Reliability in a Dynamic Retrieval Environment', Nov. 3-8, 2003, ACM, CIKM '03, pp. 443-452.*

Ghahrmani, Z., and K.A. Heller, "Bayesian Sets," Advances in Neural Information Processing Systems 18 (2006), 8 pages.

"Google Sets," ©2007 Google, <http://labs.google.com/sets> [retrieved Feb. 13, 2008].

* cited by examiner

FILTERING INVALID TOKENS FROM A DOCUMENT USING HIGH IDF TOKEN FILTERING

CROSS-REFERENCE TO RELATED APPLICATION

This application claims the benefit of U.S. Provisional Patent Application No. 60/940,367, filed May 25, 2007, which is incorporated herein by reference. This application is also related to commonly assigned and co-pending U.S. patent application Ser. No. 11/754,237, filed May 25, 2007.

BACKGROUND

Figure 1:
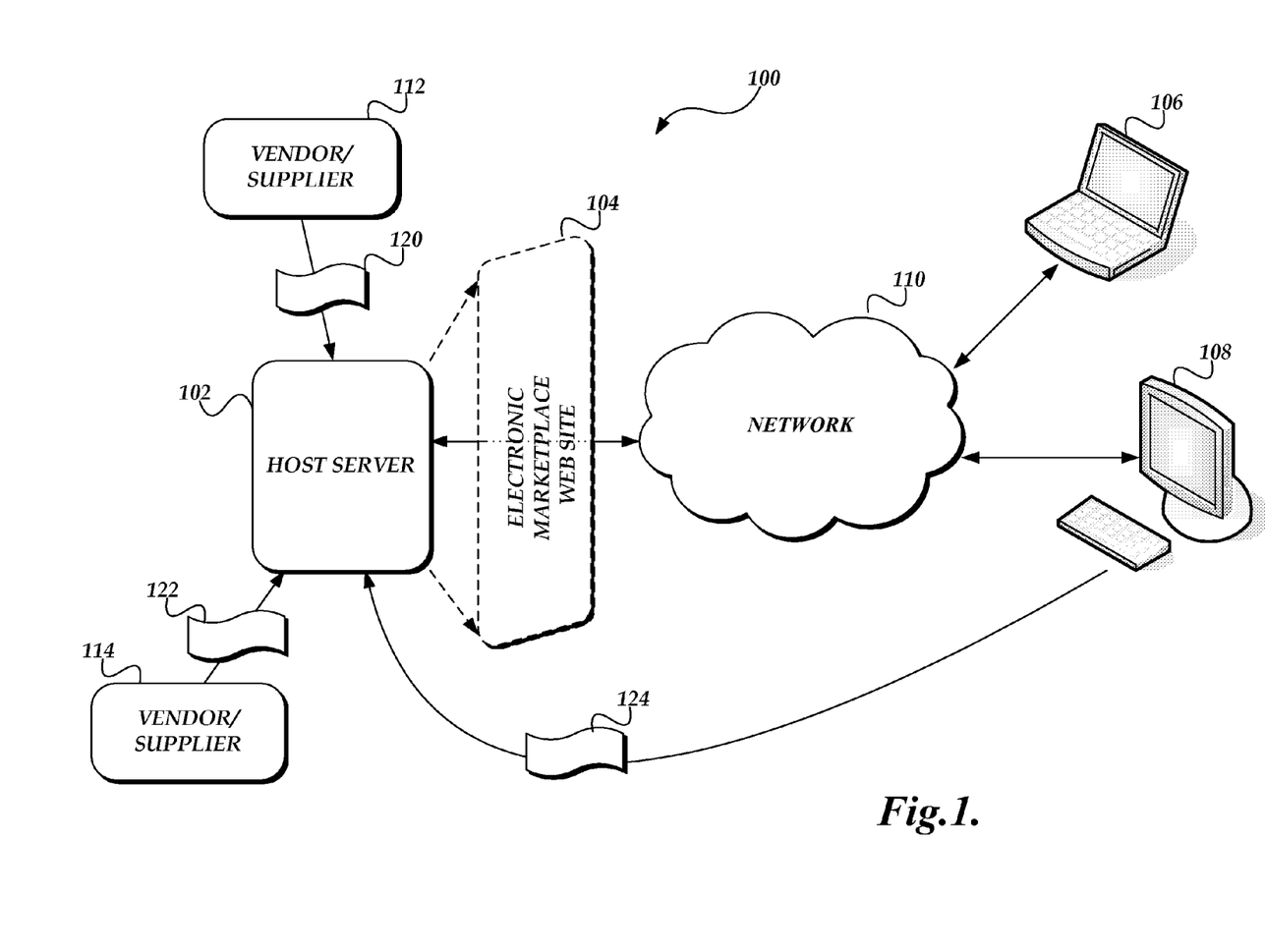
FIG. 1 is a pictorial diagram of an illustrative networked environment providing an electronic marketplace.

One aspect associated with the widespread usage of networks generally, and the Internet particularly, has been the emergence of electronic marketplaces. An electronic marketplace is typically a network site that offers a consistent, seemingly united, electronic storefront to networked consumers. Typically, the electronic marketplace is hosted on the Internet as one or more Web pages, and viewed by a consumer via a networked computer. FIG. 1 is a pictorial diagram of an illustrative networked environment 100 that includes an electronic marketplace. In particular, the networked environment 100 includes a host server 102 that hosts the electronic marketplace 104. As indicated above, a typical electronic marketplace is comprised of one or more Web pages that are viewable on a consumer's computer via a Web browser. However, for illustration purposes, the electronic marketplace 104 is shown in FIG. 1 as residing "outside" of a client computer. Consumer computers, such as consumer computers 106-108, connect to the host server to access the electronic marketplace via a network 110, such as, but not limited to, the Internet. The electronic marketplace 104 allows consumers, via their client computers 106-108, to view and purchase items offered for sale or lease on the electronic marketplace.

In many instances, an electronic marketplace 104 includes items from many different vendors or suppliers. For example, as shown in FIG. 1, the electronic marketplace 104 offers items from vendors 112 and 114. Still further, these electronic marketplaces allow individuals to offer both new and used items to consumers via the electronic marketplace. To do so, the vendors/suppliers 112-114, as well as consumers, such as a consumer operating consumer device 108, provide descriptions of products to be offered on the electronic marketplace 104 to the host server 102. The illustrated descriptions include descriptions 120-124.

Figures 2A, 2B:
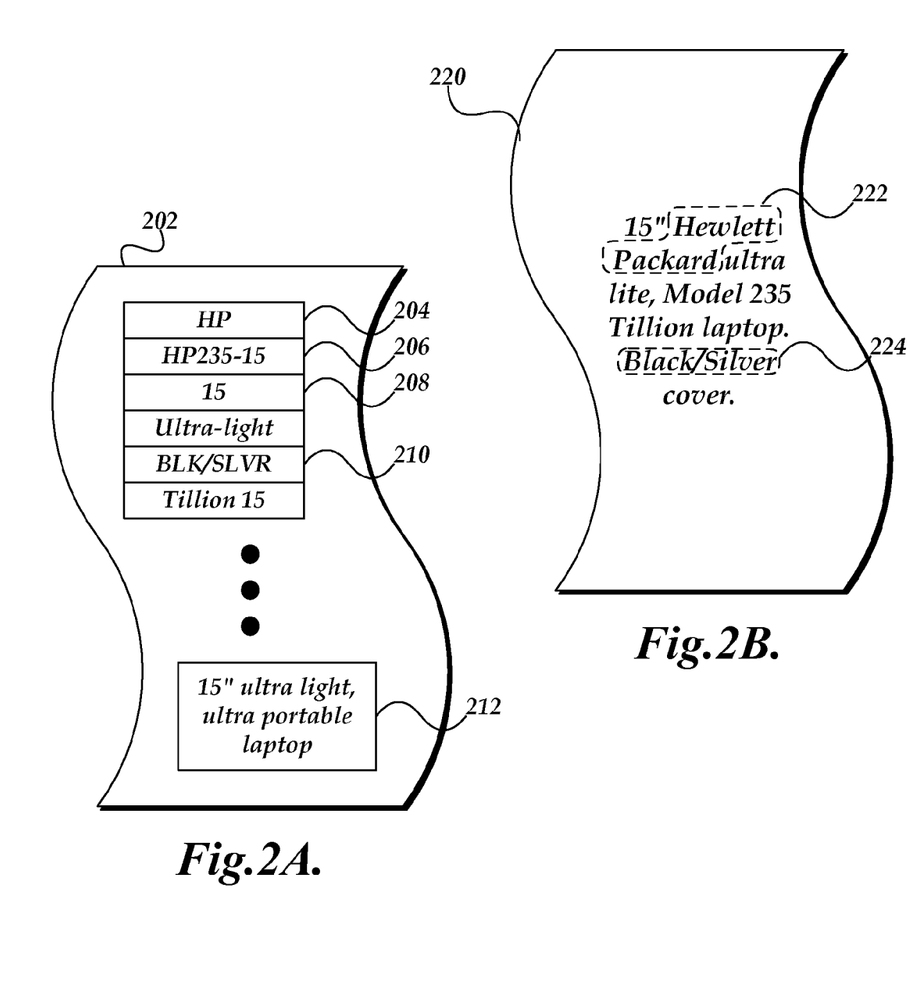
FIGS. 2A-2C are representative document descriptions regarding products from vendors, suitable for illustrating documents describing similar and dissimilar products.

Naturally, if an item is offered through the electronic marketplace 104, all instances of that item from all vendors should be displayed to the consumer as various options of the same item rather than individual items that are viewed separately. Unfortunately, since individual vendors and consumer/sellers provide the host server 102 with their own descriptions of the products that they wish to sell, it becomes an onerous, manual task to determine which product descriptions reference the same items and which reference different items. For example, FIGS. 2A-2C present illustrative product description documents submitted from two separate vendors. As suggested by the illustration, document 202 of FIG. 2A includes a structured or fielded document with information organized in a structure, such as manufacturer 204, model number 206, screen size 208, case color 210, and a brief description 212. Document 220 of FIG. 2B is not structured or fielded, but rather a free-form paragraph description (typical of product descriptions provided by consumers) that includes important information. With regard to documents 202 and 220, and upon inspection of the two documents, a person familiar with the subject matter of laptops (or even one not quite so familiar) is likely to recognize that these two documents likely describe the same product. In other words, a person would recognize that the manufacturer ("HP") identified in the manufacturer field 204 and the name "Hewlett Packard" in text area 222 are a reference to the same manufacturer. Similarly, a person would likely recognize that the case color "BLK/SLVR" in the case color field 210 is the abbreviation for "Black/Silver" as recited in full in text area 224. From comparisons of other terms/fields, while not necessarily resulting in a letter-perfect match, a person would recognize the two documents as being substantially similar, i.e., describing the same or substantially the same product or subject matter. Moreover, if these descriptions were properly identified as duplicates (i.e., that the subject matter described by both documents is the same), a host server 102 would group them together as descriptions of a single product item.

Figure 2C:
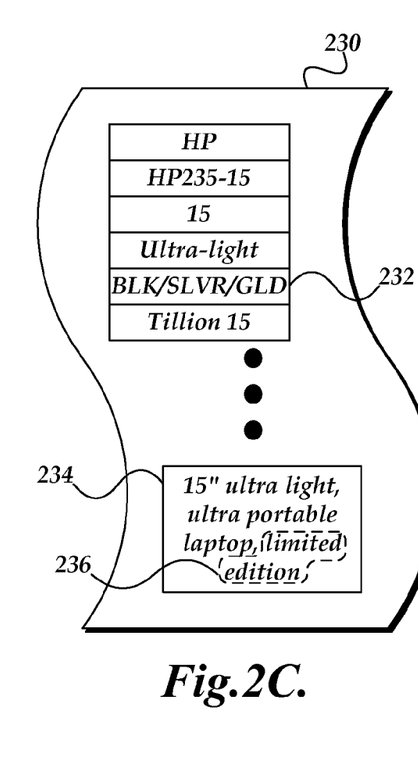

Document 230 of FIG. 2C is a structured document and includes fields that are very similar to that of document 202. However, in contrast to document 202 (and to document 220), there are certain differences between the two that a person would likely recognize and conclude that they describe different products. For example, the case color field 232 recites "BLK/SLVR/GLD," adding an additional color to the case. Additionally, the product description 234 includes additional language, "limited edition," in text area 236 that would indicate that this laptop, in contrast to the one described in document 202, is somewhat different (i.e., a limited edition version) and not a duplicate.

Unfortunately, while a person can be trained to discern the differences between duplicate product descriptions, it is difficult for a computer to programmatically analyze two documents to determine whether or not they are duplicates (i.e., whether or not they describe the same product.) Clearly, this problem is exacerbated when the number of products offered by an electronic marketplace 104 (originating from a myriad of vendors) is measured in hundreds of thousands or more.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, a method for filtering tokens from a first document for determining whether the first document describes substantially similar subject matter to the subject matter described by a second document are presented. In one embodiment, a first document is obtained. The first document is organized into a plurality of fields, and at least some of the fields includes tokens representing the subject matter described by the first document. A field of the first document is selected and a token from within the selected field having the highest inverse document frequency (IDF) with regard to a document corpus is selected. Those tokens from the first document that have a higher IDF than the selected token are removed. Using the remaining tokens, a determination is made as to whether the first document describes substantially similar subject matter to the subject matter described by a second document. An indication is provided as to whether the first document describes substantially similar subject matter to the subject matter described by a second document according to the determination.

According to an additional embodiment, a method for determining whether a first document describes substantially similar subject matter to the subject matter described by second document in a document corpus is presented. A first document is obtained. The first document is organized into a plurality of fields, and at least some of the fields include tokens representing the subject matter described by the first document. A field from the first document is selected. From that selected field, a token with the highest IDF is selected. The number of tokens in the first document with a higher IDF value than the IDF value of the selected token is determined. Another determination is made as to whether the number of tokens with a higher IDF value than the IDF value of the selected token exceeds a threshold. If the threshold is not exceeded, those tokens from the first document that have a higher IDF than the selected token are removed. Using the remaining tokens, yet another determination is made as to whether the first document describes substantially similar subject matter to the subject matter described by a second document in the document corpus. An indication is provided as to whether the first document describes substantially similar subject matter to the subject matter described by a second document in the document corpus according to the previous determination.

According to another embodiment, an electronic market place for selling items to consumer over a network is presented. The electronic market place includes a host server and a document corpus comprising a plurality of documents. The host server comprises a processor, a memory, and a network connection to a network. The host server is configured to perform as follows upon receiving a first document describing from a vendor describing an item for sale (where the first document is organized into a plurality of fields, and at least some of the fields include tokens representing the subject matter described by the first document.) The host server selects a field of the first document. From that selected field, the host server selects a token the highest IDF with regard to all tokens in the document corpus. The host server removes those tokens from the first document that have a higher IDF than the selected token. Using the remaining tokens, the host server determines whether the first document describes substantially similar subject matter to the subject matter described by a second document in the document corpus. Based on the determination, the host server provides an indication as to whether the first document describes substantially similar subject matter to the subject matter described by a second document in the document corpus according to the determination.

According to yet another embodiment, an electronic market place for selling items to consumer over a network is presented. The electronic market place includes a host server and a document corpus comprising a plurality of documents. The host server comprises a processor, a memory, and a network connection to a network communicatively coupling the host server to a network. The host server is configured to perform the following upon receiving a first document describing from a vendor describing an item for sale (where the first document is organized into a plurality of fields, and at least some of the fields include tokens representing the subject matter described by the first document.) A field from the first document is selected. From that selected field, the token with the highest IDF with regard to all tokens in the document corpus is selected. The number of tokens in the first document with a higher IDF value than the IDF value of the selected token is determined. Another determination is made as to whether the number of tokens with a higher IDF value than the IDF value of the selected token exceeds a threshold. If the threshold is not exceeded, those tokens from the first document that have a higher IDF than the selected token are removed. Using the remaining tokens, it is determined whether the first document describes substantially similar subject matter to the subject matter described by a second document in the document corpus. From this determination an indication is provided as to whether the first document describes substantially similar subject matter to the subject matter described by a second document in the document corpus according to the determination.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

By way of definition, a document corpus refers to a collection of documents. As used in this description, a document is a body of text generally directed to describing a particular subject matter. A typical, exemplary document might be a product description of digital camera, where the product description includes the camera's manufacturer, a product number, various technical features, cosmetic features, and the like. A document corpus may be stored in one or more data stores or catalogues. In the following discussion, the referredto document corpus is a collection of product descriptions of products offered for sale by various providers. The product descriptions are generally provided to a host server 102 conducting an electronic marketplace 104 for consumers.

By way of further definition, while the following discussion will frequently be made in regard to determining whether a first document is substantially similar to another document in a document corpus and therefore considered a duplicate, this is a shorthand reference to determining whether the subject matter described by a first document is the same or substantially the same subject matter described by another document in the document corpus. As suggested above, for purposes of simplicity and clarity in describing the disclosed subject matter, when the subject matter described by one document is the same or substantially similar to the subject matter described by another document or documents, these documents are said to be "duplicates."

Generally speaking, there are two aspects for determining whether or not a given document is substantially similar to another document in the document corpus (i.e., the subject matter described by a first document is the same as the subject matter described by another document): identification and precision. Identification refers to identifying documents in the document corpus that are candidate duplicate documents. Precision refers to the accuracy of identifying only true duplicates of a given document. Quite frequently, in order to ensure that actual or true duplicates for a first document are found among the documents in a document corpus, it is often desirable to be "aggressive" in selecting candidate duplicate documents such that there are several candidates that are not duplicates, i.e., false positives. Stated differently, identification should select a duplicate (provided a duplicate exists in the document corpus) nearly 100% of the time, at the expense of including candidate documents that are not true duplicates. According to aspects of the disclosed subject matter, to improve the precision (i.e., the accuracy of identifying only true duplicates), after aggressively identifying candidate documents, filters may be applied to "weed out" the non-duplicate candidate documents.

Figure 3:
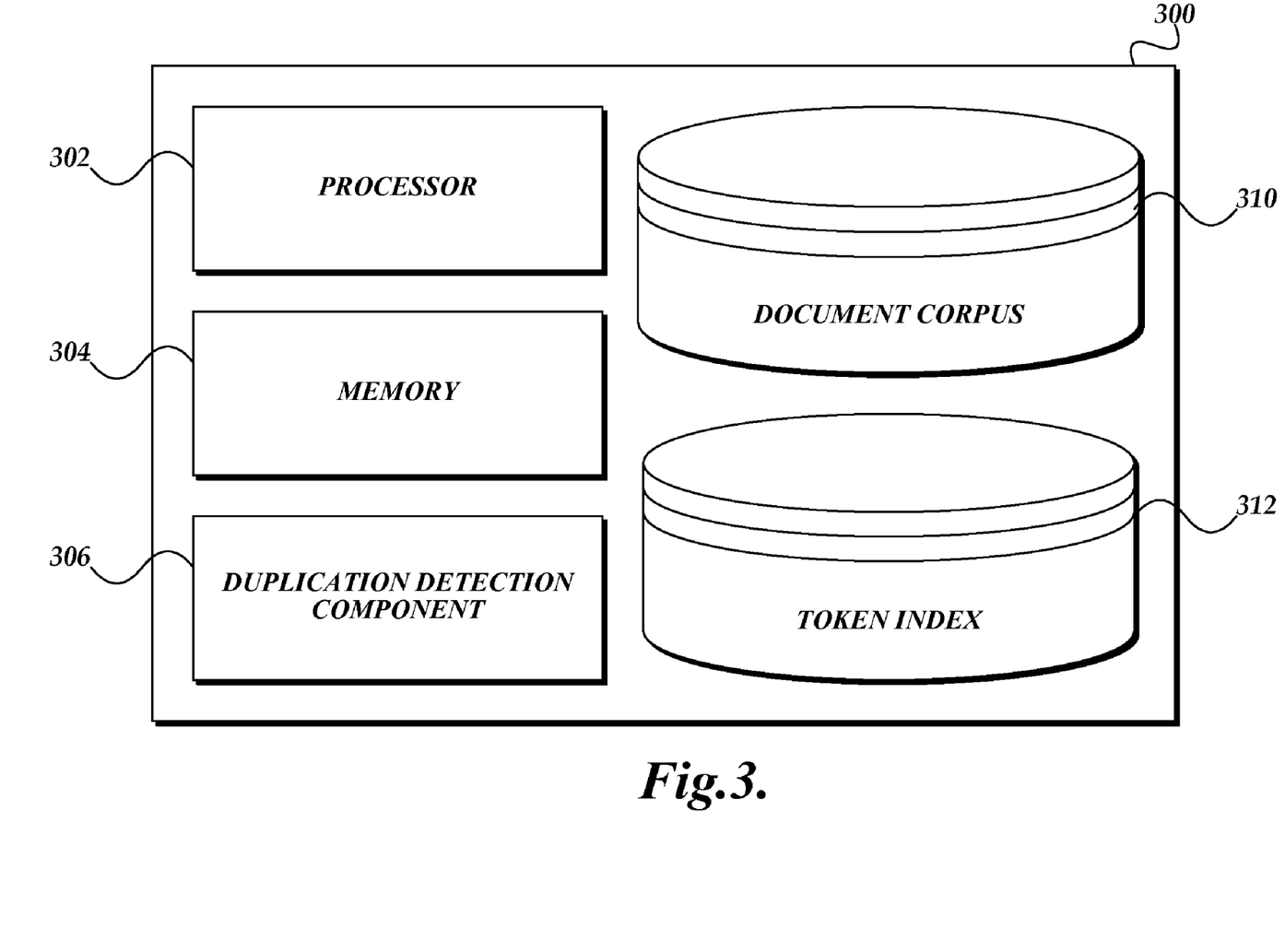
FIG. 3 is a block diagram illustrating logical components of a computer system suitable for determining whether a submitted document is substantially similar to another document and therefore considered a duplicate, in accordance with one or more embodiments of the disclosed subject matter.

FIG. 3 is a block diagram illustrating logical components of a computer system 300 suitable for detecting whether a first document is a duplicate of one or more other documents in a document corpus. Prior to discussing these components, it should be appreciated that the components described herein are logical components, not necessarily actual components. In an actual embodiment, any one of the logical components may be embodied in one or more discrete actual components, and/or combined with several components.

The computer system 300 includes a processor 302 for executing instructions to determine whether a first document is substantially similar to another document in a document corpus. The processor executes instructions from a memory 304 that may be comprised of random access memory (RAM), read-only memory (ROM), disk storage, remote online storage, and the like. The computer system is illustrated as also including a duplicate detection component 306 which is used by the computer system 300 to detect whether a first document is substantially similar to another document in a document corpus. Of course, in an actual embodiment, the duplicate detection component 306 may be implemented as a hardware component, a software component (stored in the memory 304), a combination of hardware and software, a service provided by another computing device, and the like.

The computer system 300 is also illustrated as including a document corpus 310. As indicated above, the document corpus is a collection of documents, such as documents describing a product or service for sale. This document corpus may be organized in a database, such as illustrated in FIG. 3, but it is not necessary to be in a database. It may be, however, important to be able to access the documents in the document corpus when identifying and filtering for duplicates, as will be described in more detail below. While the document corpus 310 is illustrated as being a part of the computer system 300, in an actual embodiment, the document corpus 310 may be stored external, yet accessible, to the computer system 300.

The computer system 300 is also illustrated as including a token index 312. As will be described below, the token index corresponds to an index of tokens (including alphabetic strings, numbers, and alpha-numeric strings) from the various documents in the document corpus 310. As is common with indices, the token index 312 will typically include information such as, but not limited to, the frequency of a token in each document, references to the documents for each token, the document field in which the token is found, and the like. As with the document corpus 310, while illustrated as a logical component of the computer system 300, in an actual embodiment the token index 312 may be incorporated in the computer system which is otherwise accessible to the computer system for use in determining whether a document is substantially similar to one or more documents in a document corpus 310, and therefore considered to be a duplicate document. Further still, the index, while suggestively illustrated as being stored in a database, may be formed and maintained in an manner according to the needs of the implementing system.

Figure 4:
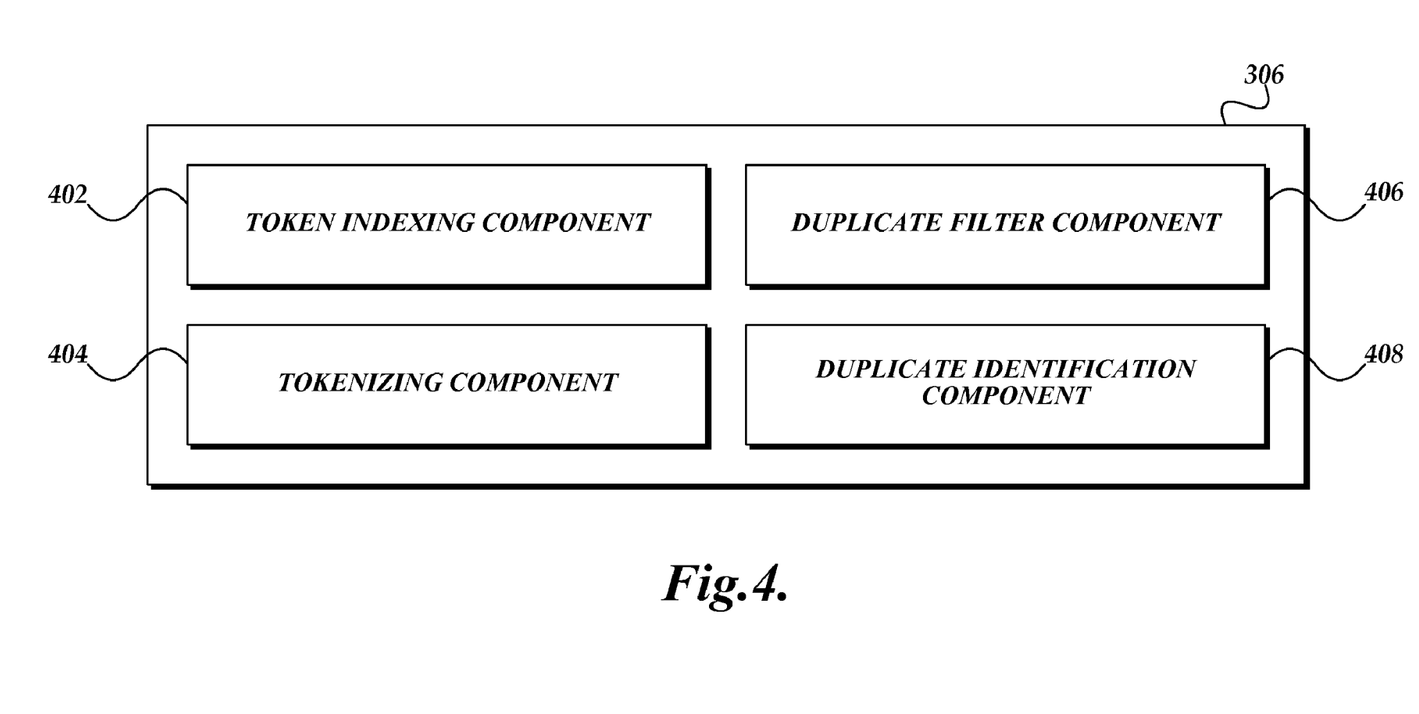
FIG. 4 is a block diagram illustrating logical components of duplicate detection component, as introduced in regard to the host server of FIG. 3, for detecting duplicate document descriptions submitted to the host server, in accordance with one or more embodiments of the disclosed subject matter.

Turning again to the duplicate detection component 306, it should be appreciated that this component may be broken down into its own logical components. To that end, FIG. 4 is a block diagram illustrating logical components of a duplicate detection component 306 formed according to the disclosed subject matter. As shown in FIG. 4, the duplicate detection component 306 includes a token indexing component 402, a tokenizing component 404, a duplicate filter component 406, and a duplicate identification component 408. Of course, it should be appreciated that while a duplicate detection component 306 would include these logical components, in an actual embodiment, there may be additional components not described herein. Further still, each of the above-described components may be combined in one or more of the logical components. Accordingly, the logical divisions shown in FIG. 4 should be viewed as illustrative only, and not viewed as limiting upon the disclosed subject matter.

The token indexing component 402 is used to generate the token index 312 described above, using tokens generated by the tokenizing component 404. The tokenizing component 404 parses a document to identify discrete alphabetic, alpha-numeric, and numeric stings, and converts the identified strings into a set of tokens. The duplicate filter component 406 filters candidate duplicate documents identified by the duplicate identification component 408 to eliminate those candidates that are not true duplicates of (i.e., are not substantially similar to) a first document. Finally, as suggested, the duplicate identification component 408 identifies potential duplicates, referred to as candidate duplicate documents or, more simply, candidate documents, of a given document in the document corpus 310.

To better illustrate the operation of the various components described in both FIGS. 3 and 4, reference is made to various flow diagrams. As suggested above, the duplicate detection component 306 determines whether a given document, such as a product description offered by a vendor/consumer, is a duplicate of another document in a document corpus 310. This determination is made, at least in part, by use of the token index 312. Accordingly, FIG. 5 is a flow diagram of an illustrative routine 500 for generating a token index 312 from the documents of a document corpus 310, in accordance with one or more embodiments of the disclosed subject matter.

Figure 5:
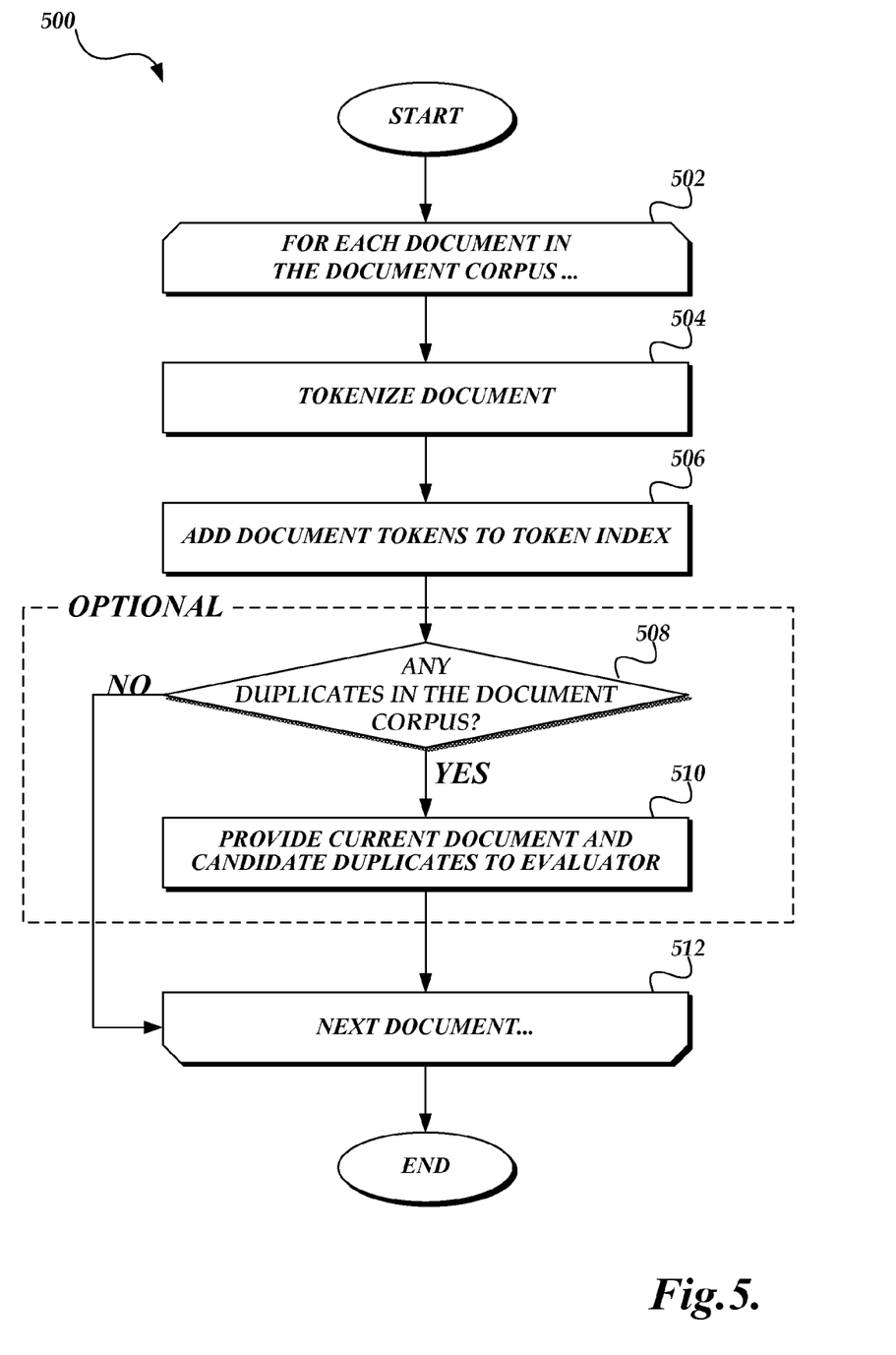
FIG. 5 is a flow diagram of an illustrative routine for preparing an index of a document corpus for use in duplicate detection according to aspects and embodiments of the disclosed subject matter.

As shown in FIG. 5, control block 502 is the beginning of an iterative process that loops through each of the documents (i.e., "for each document") in the document corpus 310 in order to generate the token index 312. This iterative process includes all of the steps 504-510 between the start of the loop 502 and end control block 512. Thus, for a given document in the document corpus 310, at block 504, the document is tokenized. As indicated already, tokenizing a document comprises generating a set of tokens, each corresponding to a string of characters in the document, including alphabetic strings, alpha-numeric strings, and numeric strings. Only one token is generated for a unique set or string of characters such that if the same string occurs more than once in the document, only one token for that string will be generated (though the number of occurrences of that string in the document may be noted.) After generating a set of tokens for the document, at block 506, the set of tokens for the document are added to the token index 312.

At this point, if the assumption can be made that there are no duplicates already in the document corpus 310, the process can skip the next two steps which are directed to detecting duplicates in those documents already indexed. Hence, the steps at decision block 508 and block 510 are identified as being optional. Alternatively, however, assuming that it would be good to verify that there are not already duplicates in the document corpus, the routine 500 proceeds to decision block 508 where a determination is made as to whether there are any duplicates of the current document in the document corpus. Determining whether there are one or more duplicates of the document in the document corpus 310 is described in greater detail below in regard to FIGS. 7A and 7B. If the there are one or more duplicates of the current document in the document corpus 310, at block 510 the set of candidate documents and the current document may be provided to an evaluator for final determination as to whether they are, in fact, duplicates. Moreover, should the evaluator determine that at least some of the documents are duplicates, the evaluator may associate the documents in the document corpus 310 as referencing or describing the same product. Thereafter, or if there are no candidate documents for the current document, the process 500 moves to end control block 512 that causes a return to control block 502 where the process iterates to the next document in the document corpus 310. This repetition continues until the process 500 has iterated through all of the documents in the document corpus 310, and then terminates.

Figure 6:
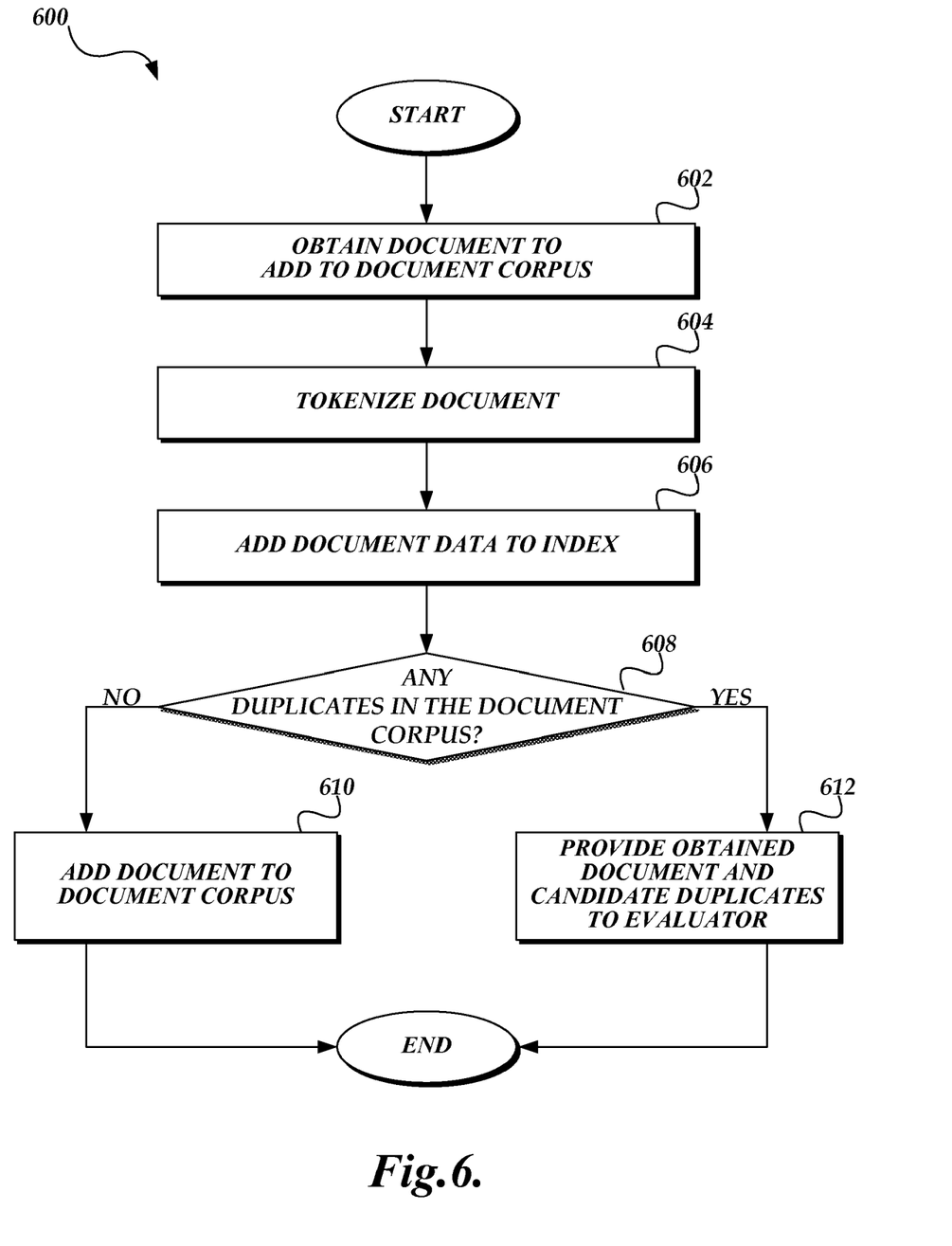
FIG. 6 is a flow diagram of an illustrative routine for determining whether a submitted document is substantially similar to one or more other documents in a document corpus and, therefore, considered a duplicate, in accordance with one or more embodiments of the disclosed subject matter.

In contrast to indexing the documents in the document corpus 310 as described in regard to FIG. 5, FIG. 6 is a flow diagram of an illustrative routine 600 for detecting and identifying candidate documents when receiving and adding a new document to the document corpus 310, in accordance with one or more embodiments of the disclosed subject matter. Beginning at block 602, a document for addition to the document corpus 310 is obtained. At block 604, the obtained document is tokenized, yielding a set of tokens for the obtained document as discussed above. At block 606, the obtained document is added to the token index 312.

Figure 7A:
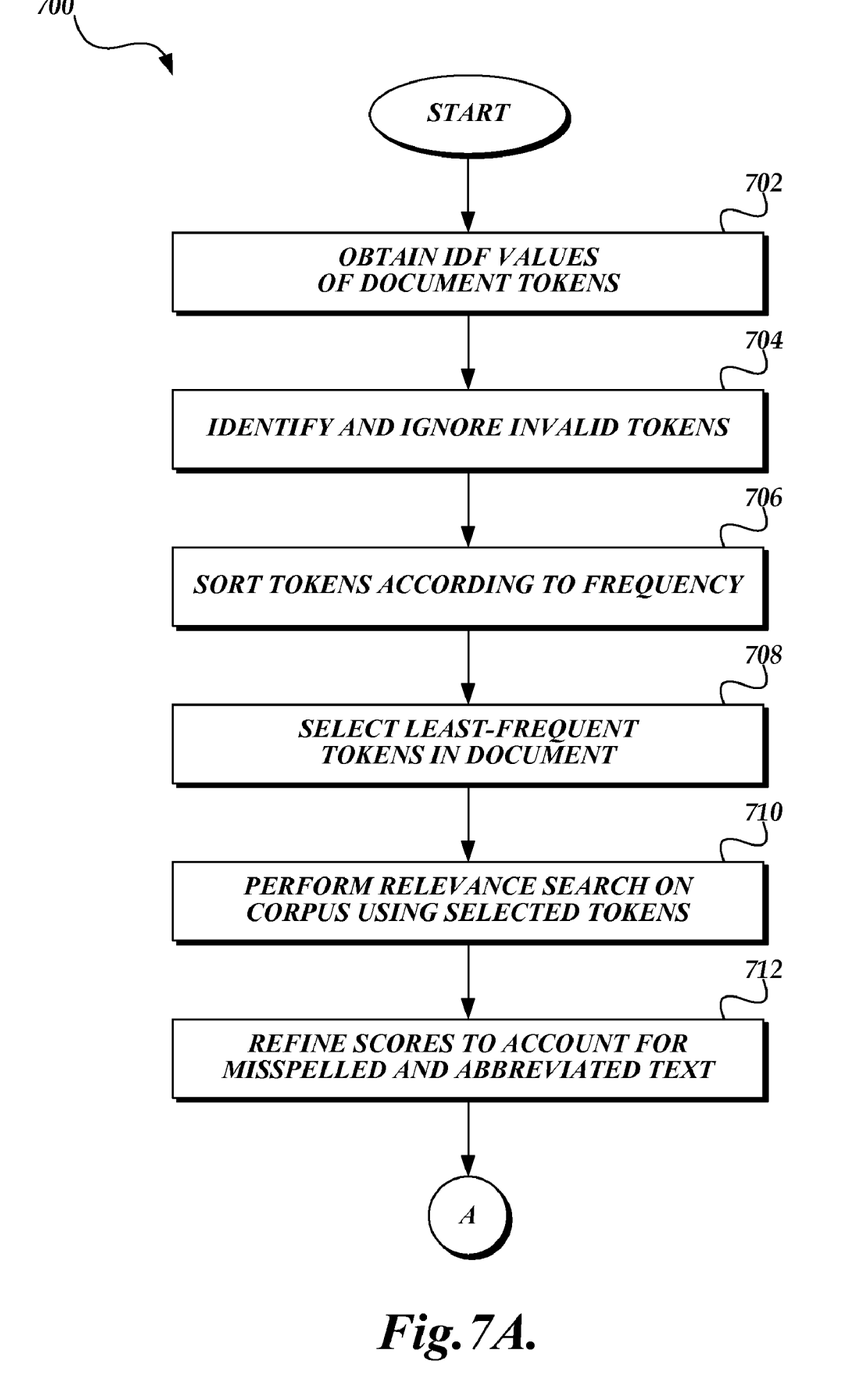
FIGS. 7A-7B are a flow diagram of an illustrative routine for identifying candidate duplicate documents for a submitted document and filtering out false duplicates from the candidate documents, in accordance with one or more embodiments of the disclosed subject matter.

At decision block 608, a determination is made as to whether or not the obtained document is substantially similar to, and therefore considered a duplicate of, one or more other documents in the document corpus 310, as described below in regard to FIGS. 7A and 7B. If it is determined that the obtained document is not substantially similar to (and therefore not a duplicate of) other documents in the document corpus 310, at block 610 the document is simply added as a new item to the document corpus. Alternatively, if it is determined that the document may be a duplicate of one or more other documents already in the document corpus 310, at block 612 the obtained document and the set of candidate documents identified as potential duplicates are provided to an evaluator. As above, should the evaluator determine that at least some of the candidate duplicate documents are, in fact, substantially similar and therefore considered duplicates of the obtained document, the evaluator may associate the those duplicates in the document corpus 310. After providing the obtained document to the evaluator, the routine 600 terminates.

As mentioned above, FIGS. 7A and 7B are of a flow diagram of an illustrative routine 700 for determining a set of candidate documents (if any) for a current document from the documents in the document corpus 310, in accordance with one or more embodiments of the disclosed subject matter. Beginning at block 702, from the token information generated for the current document, the IDF values of the tokens in the current document (i.e., the number of occurrences of the string represented by each token in the document corpus) are obtained. At block 704, invalid tokens (such as misspellings, inadvertent entries, and the like) are identified and eliminated from evaluation. Eliminating invalid tokens ensures a greater likelihood of properly identifying candidate duplicate documents. What remains are valid tokens with their associated occurrence frequency.

At block 706, the tokens are sorted according to their frequency in the current document. At block 708, one or more of the least frequent tokens (i.e., those with the highest IDF) from the current document are selected. The actual number of tokens selected may be based on a threshold percentage of the total number of tokens in the document, on an absolute threshold number, or according to a particular threshold frequency. Other heuristics for selecting the tokens may further be used, all of which are contemplated as falling within the scope of the disclosed subject matter. Further still, the various thresholds and/or heuristics for selecting the least frequently occurring tokens from the current document may be user configurable.

At block 710, using the selected tokens, a relevance search is performed on the token index 312. As those skilled in the art will appreciate, a relevance search, as used in this context, matches the selected tokens of the current document to other documents in the document corpus having all or some of the same tokens. Moreover, a relevance search generates a score between the current document and another document (based on the amount of search tokens that are found in common with each of the other documents). Still further, a relevance search generates scores based on exact matches between tokens. As indicated above, some documents may include structural or field information. While comparing tokens of similar fields may provide useful information, it should be appreciated that the relevance search of block 710 is an un-fielded search, i.e., the relevance search is made irrespective of any field relation information.

After the relevance search, recognizing the relevance score is based on exact matches and that many of the tokens may be matches but for being slightly misspelled or abbreviated, at block 712 the scores returned from the relevance search are refined to account for such common entry differences, resulting in improved scores (i.e., the likelihood that a candidate document is a duplicate) that more accurately reflect the relevance between the candidate duplicate documents and the current document.

Figure 7B:
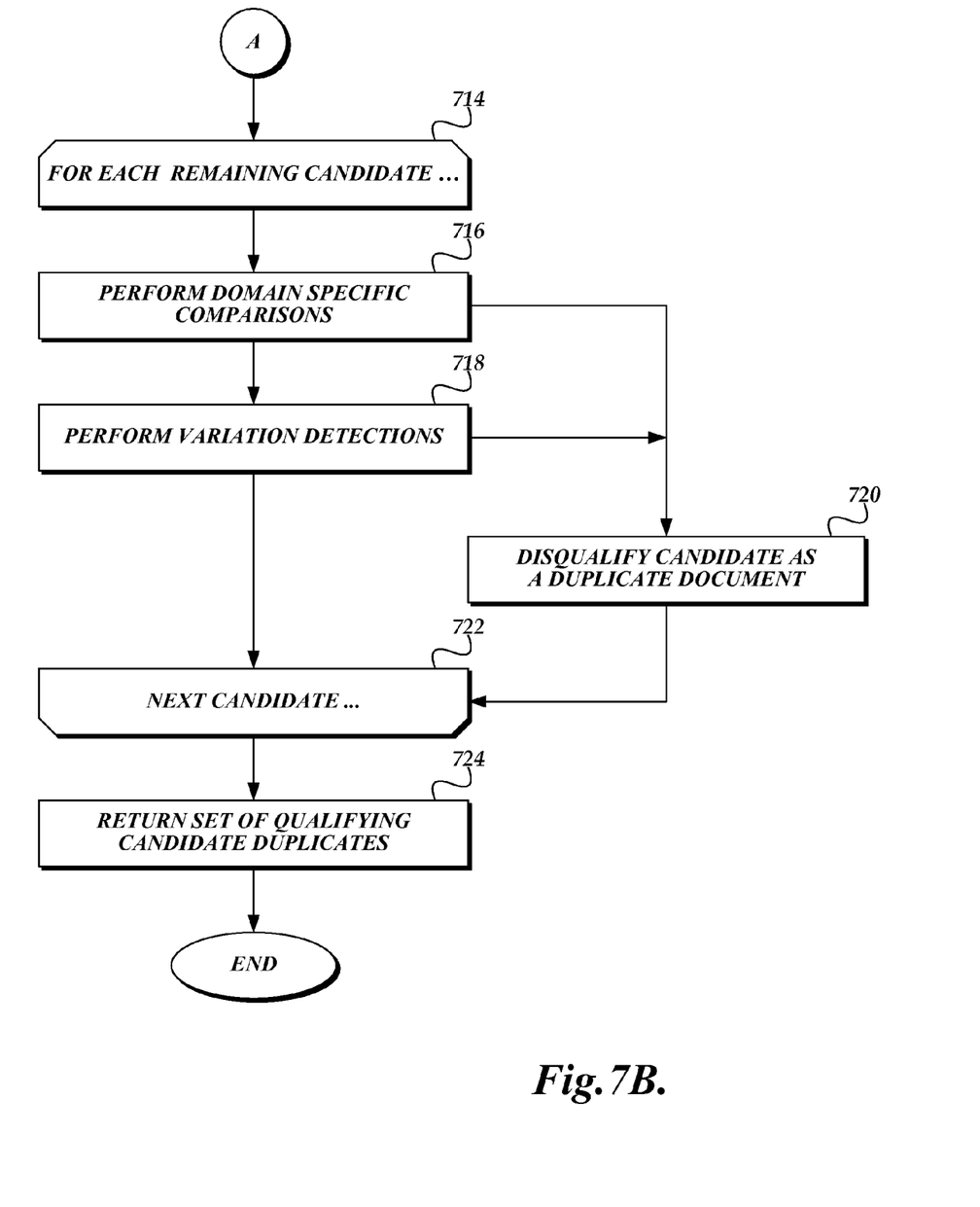

Turning now to FIG. 7B, at control block 714 a looping construct is begun that iterates through the results/candidate documents identified by the previous steps. More particularly, the looping construct iterates through those candidate documents whose score exceeds a predetermined threshold value. Thus, for each identified candidate document with a score above a threshold value, steps 716-720 may be executed. Blocks 716 and 718 identify various filters that may be applied to each candidate document to determine, to a greater degree, whether a candidate document may be a true duplicate of the current document (such that it describes the same or substantially the same subject matter.) At end control block 724, the next candidate document with a score above a given threshold is selected and the loop is repeated. When there are no additional candidate documents with a resulting score above the predetermined threshold, the routine 700 proceeds to block 724.

With regard to the filtering steps 716 and 718, in contrast to the relevance search of block 710, at block 716 domain specific (or fielded) comparisons are made between information in the current document and the selected candidate document. Domain specific comparisons are directed to types (or domains/fields) of information in each document when present and identifiable in the documents. These domains include merchant source (i.e., whether the source of the current document is the same as the source for the selected candidate document); package quantities; UPC or product identification values; manufacturer, and the like. As an additional domain specific comparison, a comparison as to the source of both documents (the current document and the candidate document) is made. If the source of the current document and the candidate document is the same, i.e., submitted by the same merchant, an assumption that a merchant would not provide duplicate documents implies that the products described by the two documents are different. Alternatively, if the package quantities, the UPC values, or the manufacturers differ, then the current document and the selected candidate document are not duplicates (i.e., describe different products). If the domain comparisons of block 716 show that the documents are not duplicates, the process 700 proceeds to block 720 where the candidate document is disqualified as a duplicate of the current document.

If the candidate duplicate document is not disqualified as a duplicate document based on domain comparisons, at block 718 variation detections are performed on the candidate document and the current document to determine whether the two documents include mutually exclusive variations such that, while similar, the described subject matter cannot be said to be true duplicates. Examples of such mutually exclusive variations may include the case color (e.g., pink, black, blue, or red) of an otherwise similar portable media player. Accordingly, if the current document and candidate duplicate documents are determined to be such variations, they are not considered duplicates and the routine 700 proceeds to block 720 where the candidate document is disqualified as a duplicate of the current document. If the candidate document has not been disqualified, or after disqualifying the candidate document as a duplicate, the routine 700 proceeds to end control block 722.

At block 724, after processing each candidate document having a score above a given threshold, the set of candidate documents that have not been disqualified as duplicates are returned as the results of the routine 700, and the routine terminates.

It should be appreciated, that while the above described routine 700 (as well as all other routines) illustrate a particular order, those skilled in the art will recognize that various modifications may be made to the order without departing from the scope and intent of the disclosed subject matter.

Yet another aspect in determining whether a given document describes the same or substantially similar subject matter (i.e., are "duplicates") is to compare the documents according to their common use of rare (infrequently occurring) and/or distinctive terms. Stated differently, if a particular term/word/string of characters is found to be used infrequently within the documents of a document corpus 310 and when two documents include that term, there is an increased likelihood that the two documents are describing substantially the same subject matter. In general, the lower the frequency/occurrence of a term throughout the document corpus, the more distinctive the term becomes in being an identifying characteristic for identifying duplicate documents. Low frequency of a term in a document corpus 310 can be alternative expressed as the inverse document frequency (IDF), where the higher the IDF, the less frequent the term occurs within the document corpus. Of course, care should be taken to ensure that infrequently occurring terms are good or valid terms for suggesting likelihood of duplicates. For example, a misspelled word or vendor-specific value may have a high IDF value, and yet be invalid to use for identifying duplicate documents.

Figure 8:
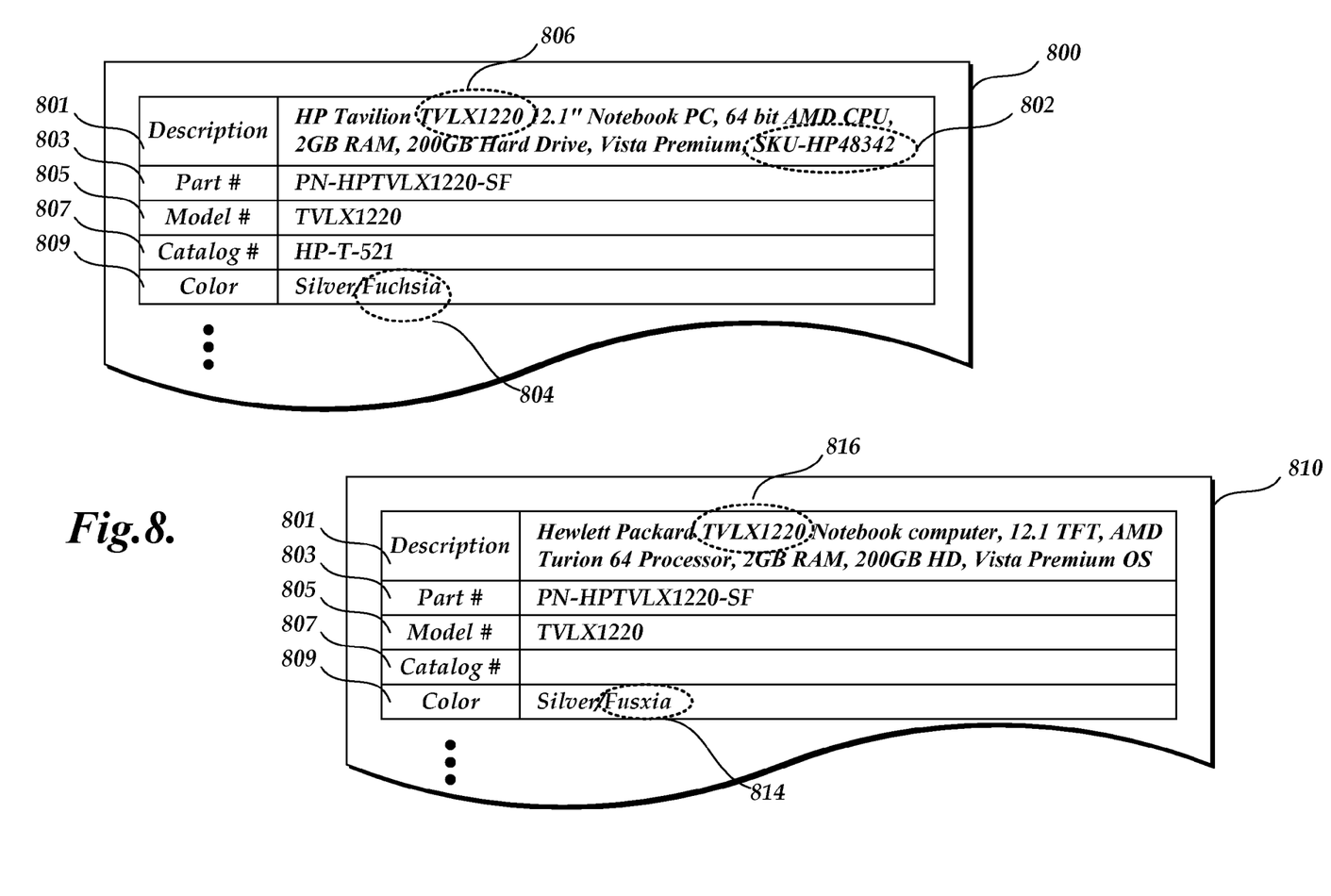
FIG. 8 is a diagram of illustrative product descriptions for describing a filtering process for filtering high inverse document frequency tokens that improperly influence the comparison of product descriptions.

In addition to increasing the likelihood that two documents describe substantially similar subject matter, the frequency of terms that tend to be distinctive (i.e., high IDF terms) can be used to identify and ignore invalid terms or tokens, such as misspelled terms and vendor-proprietary terms that have crept into a document. (Removing invalid tokens was mentioned above in regard to step 704 of FIG. 7A). For example, FIG. 8 is a pictorial diagram of illustrative product descriptions, description 800 and description 810, useful for describing aspects of high IDF document filtering. As discussed already, typically the descriptions 800 and 810 include various fields of information such as, but not limited to, a description field, a product field, model field, and catalog number field, color field, and the like. Those familiar with laptop computers would likely conclude that these two descriptions (800 and 810) are directed to the same item and are, therefore, duplicates. The presence of the presumable high IDF term, "TVLX1220" (terms 806 and 816), in the product description fields 801 may indicate that the descriptions 800 and 810 describe substantially the same subject matter. However, a programmatic evaluation of descriptions 800 and 810 might conclude otherwise due, at least, to the presence of vendor-supplied information 802 ("SKU-HP48342") in the product description field 801 of description 800, as well as the disparate color spellings 804 and 812 in the color fields 809.

To ensure that only valid terms from descriptions are evaluation in a relevance search, i.e., to identify and ignore invalid terms/tokens in product descriptions, the IDF of the various tokens can be used. Unlike the above described non-fielded relevance searches, the following IDF filtering process relies on the fact that some fields in the description are generally distinct, descriptive, and possess a high IDF. For example, but not as a limitation, the part number 803, model number 805, and catalog number 807 fields typically include terms that have a very high IDF.

Figure 9:
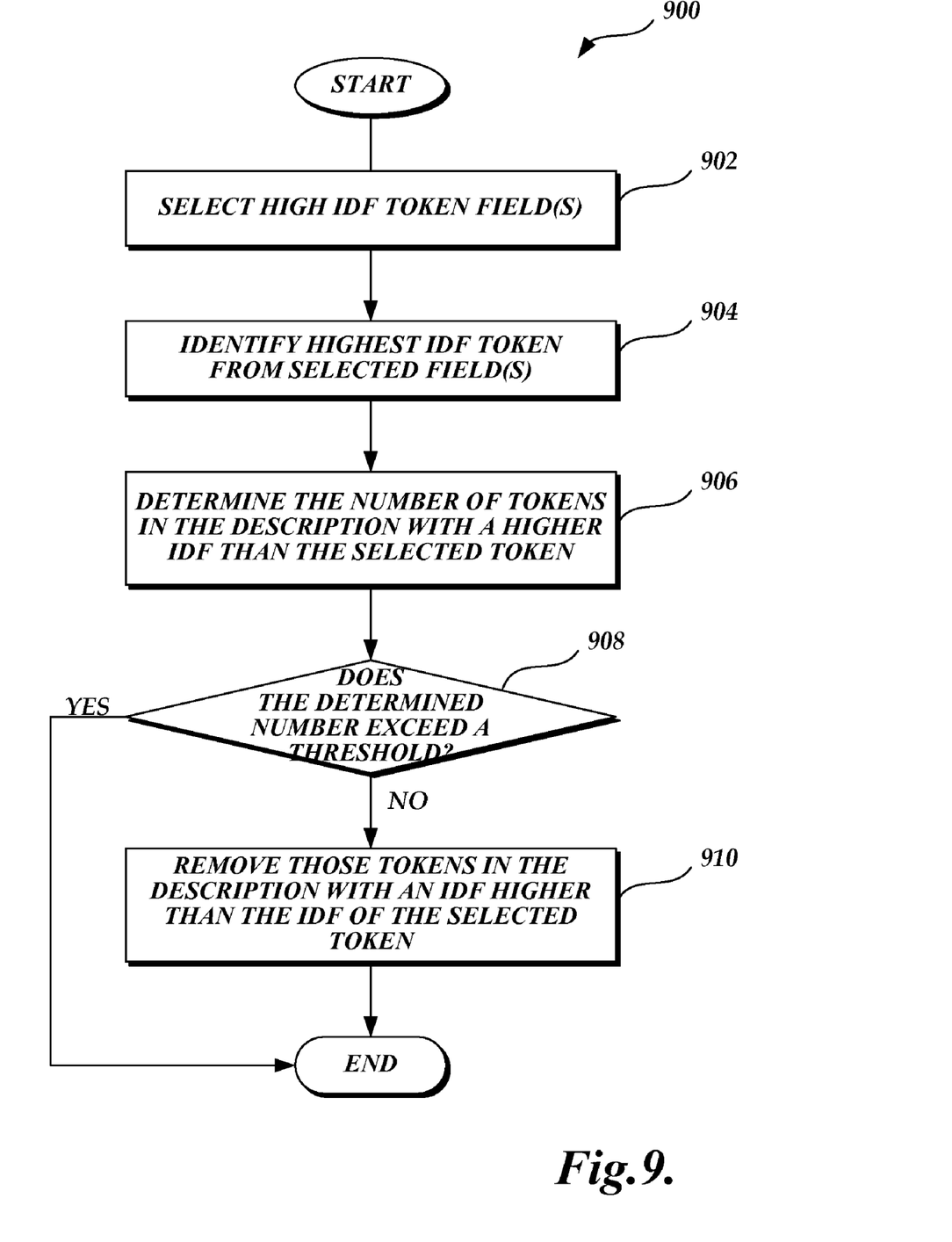
FIG. 9 is a flow diagram of an illustrative routine for filtering invalid terms/tokens from a document (at least on a temporary basis) such that a relevance search/comparison can be made with regard to documents in a document corpus.

With continued reference to FIG. 8, FIG. 9 is a flow diagram of an illustrative routine 900 for filtering invalid terms/tokens from a document (at least on a temporary basis) such that a relevance search/comparison can be made with regard to documents in a document corpus 310 as set forth above. Beginning at block 902, at least one description field, such as product number 801, model number 803, and/or catalog number 805, that are believed to contain high IDF tokens, is selected. Other fields (not shown) may include a universal product code (UPC) field, a global trade identification number (GTIN) field, a European article number (EAN) field, and the like. Of course, in an alternative embodiment, the selection of fields from which to draw high IDF tokens may be performed outside of this routine 900.

Selection of the fields from which to draw a high IDF token is based on the likelihood that the fields contain tokens/terms with high IDF values and that are also valid terms, i.e., terms that are not spurious character strings or misspelled words.

At block 904, the token/term with the highest IDF from the selected field or fields is identified. This and other IDF determinations are made according to the information in the token index 312 for the document corpus 310. If it can always be assumed that the selected token is distinctive and has a sufficiently high IDF, the routine 900 can optionally proceed to block 910 where the tokens with IDF values higher than the selected token are removed (at least for purposes of the relevance search). However, those skilled in the art will appreciate that in many cases, tokens in the selected fields are not sufficiently distinctive. For example, a part number of "1000" might be a valid part number and a fairly common term. Assuming that the only field available is part number, it is very likely that many of the terms in the description are as rare or more rare (i.e., have a higher IDF) than the term "1000." Accordingly, in at least one embodiment, the routine 900 includes a check on the selected term (as set forth in 906 and 908) to ensure that the selected token is sufficiently distinctive (with a high IDF).

At block 906, a determination is made as to the number of tokens in the description field 801 that have a higher IDF than the selected token. Thereafter, at decision block 908, a subsequent determination is made as to whether the number of tokens in the description field 801 that have a higher IDF than the selected token exceeds a particular threshold. This threshold may be based on the percentage of tokens in the description field 801 that have a higher IDF than the selected token, on an absolute value, or based on some other threshold criteria or combination of the above. If the count of tokens in the description field 801 that have a higher IDF than the selected token exceeds the threshold, it is assumed that the selected token is not sufficiently distinctive to filter out invalid tokens. Accordingly, the routine 900 terminates.

In the alternative, if, at decision block 908, the count of tokens in the description field 801 that have a higher IDF than the selected token does not exceed the threshold, it is assumed that the selected token is sufficiently distinctive to filter out invalid tokens. Hence, the routine 900 proceeds to block 910 where those tokens in the description field that have a higher IDF than the selected token are removed from the description field 801 prior to the relevance search as described above in regard to FIG. 7A.

It should be appreciated that the above-described filtering routine only temporarily removes tokens from the description, just for filtering purposes. As far as the document in the document corpus 310, or in the token index 312, no permanent changes are necessarily made. Moreover, while the routine was described in terms of filtering the description field 801, it should be appreciated that this routine may be suitably applied to any and all fields of the description 800.

While the above description has generally been made with regard to determining whether a given document describes the same or substantially similar product as described in another document in a document corpus, it should be appreciated that the inventive aspects of the disclosed subject matter may be suitably and beneficially applied to determining duplicate documents generally (based on the subject matter of the content). It should be further appreciated that the various methods described above may be located on a computer-readable medium as executable modules and/or instructions, including media such as DVD-ROMs, CD-ROMs, hard disk drives, flash drives, and the like, for execution on any number of computing devices.

Yet further applications of the disclosed subject may be made in regard to general filtering spurious or erroneous text from documents. For example, in addition to determining whether a document is substantially similar to another document, the high IDF token filtering described above may be applied singly to a document to identify and correct incorrect word spellings, identify proprietary information, and the list. Accordingly, while the high IDF token filtering is described above in regard to facilitating document comparison, it is only one application of high IDF token filtering and should not be viewed as limiting thereto.

While various embodiments have been illustrated and described, it will be appreciated that various changes can be made therein without departing from the spirit and scope of the invention.

The embodiments of the invention in which an exclusive property or privilege is claimed are defined as follows:

1. A method for filtering tokens from a first document for determining whether the first document describes substantially similar subject matter to the subject matter described by a second document, wherein each of the first and second documents is organized into a plurality of fields, and wherein at least some of the fields of both the first document and the second document include tokens representing subject matter described by their respective document, the method comprising:

obtaining the first document;

selecting a field of the first document and selecting a token from the selected field, such that the selected token has the highest inverse document frequency (IDF) within the selected field with regard to a document corpus;

temporarily removing those tokens from the first document that have a higher IDF than the selected token;

generating a score based in part upon at least one remaining token that is common to both the first and second documents;

determining whether the first document describes substantially similar subject matter to the subject matter described by the second document, wherein the determining comprises evaluating the score with respect to a threshold value; and providing an indication as to whether the first document describes substantially similar subject matter to the subject matter described by the second document according to the determination.

2. The method of claim 1, wherein selecting a field of the first document comprises selecting a field according to its likelihood to contain tokens with high IDF values.

3. The method of claim 2, wherein selecting a field of the first document comprises selecting a field of the group of fields comprising a product number field, a model number field, and a catalogue number field.

4. The method of claim 3, further comprising selecting a plurality of fields of the first document likely to contain tokens with high IDF values and selecting a token from the selected fields with the highest inverse document frequency (IDF) with regard to a document corpus.

5. The method of claim 1, further comprising:

determining the number of tokens in the first document with a higher IDF value than the selected token;

determining whether the number of tokens with a higher IDF value than the selected token exceeds a threshold; and removing those tokens from the first document that have a higher IDF than the selected token only if the threshold is not exceeded.

6. The method of claim 5, wherein the threshold comprises a percentage of the tokens in the first document.

7. The method of claim 5, wherein the threshold comprises a predetermined number of tokens.

8. A method for determining whether a first document describes substantially similar subject matter to the subject matter described by a second document in a document corpus, wherein each of the first and second documents is organized into a plurality of fields, and wherein at least some of the fields of both the first document and the second document include tokens representing subject matter described by their respective document, the method comprising:

obtaining the first document;

selecting a field of the first document and selecting a token from the selected field, such that the selected token has the highest inverse document frequency (IDF) within the selected field with regard to all tokens in the document corpus;

determining the number of tokens in the first document with a higher IDF value than the IDF value of the selected token;

determining whether the number of tokens with a higher IDF value than the IDF value of the selected token exceeds a threshold;

temporarily removing those tokens from the first document that have a higher IDF than the selected token if the threshold is not exceeded;

generating a score based in part upon at least one remaining token common to both the first and second documents;

identifying whether the first document describes substantially similar subject matter to the subject matter described by the second document in the document corpus, wherein the identifying comprises evaluating the score with respect to a threshold value; and providing an indication as to whether the first document describes substantially similar subject matter to the subject matter described by the second document in the document corpus according to the identification.

9. The method of claim 8, wherein selecting a field of the first document comprises selecting a field according to its likelihood to contain tokens with the high IDF values.

10. The method of claim 9, wherein selecting a field of the first document comprises selecting a field from the group of fields comprising a product number field, a model number field, and a catalogue number field.

11. The method of claim 10, further comprising selecting a plurality of fields of the first document likely to contain tokens with high IDF values and selecting the token from the selected fields with the highest inverse document frequency (IDF) with regard to all tokens in the document corpus.

12. The method of claim 11, wherein the threshold comprises a percentage of all of the tokens in the first document.

13. The method of claim 11, wherein the threshold comprises a predetermined number of tokens.

14. A tangible computer-readable medium bearing computer-executable instructions which, when executed on a computing device, carry out a method for filtering tokens from a first document for determining whether the first document describes substantially similar subject matter to the subject matter described by a second document, wherein each of the first and second documents is organized into a plurality of fields, and wherein at least some of the fields of both the first document and the second document include tokens representing subject matter described by their respective document, the method comprising:

obtaining the first document;

selecting a field of the first document and selecting a token from the selected field, such that the selected token has the highest inverse document frequency (IDF) within the selected field with regard to a document corpus;

temporarily removing those tokens from the first document that have a higher IDF than the selected token;

generating a score based in part upon at least one remaining token common to both the first and second documents;

determining whether the first document describes substantially similar subject matter to the subject matter described by the second document, wherein the determining comprises evaluating the score with respect to a threshold value; and providing an indication as to whether the first document describes substantially similar subject matter to the subject matter described by the second document according to the determination.

15. An electronic market place for selling items to consumer over a network, comprising:

a host server including a processor, a memory, and a network connection to a network; and a document corpus comprising a plurality of documents related to items for sale from a plurality of vendors;

wherein the host server is configured to, upon receiving a first document from a vendor relating to an item for sale, the first document being organized into a plurality of fields, and wherein at least some of the fields include tokens representing the subject matter of the first document:

select a field of the first document;

select a token from the selected field, such that the selected token has the highest inverse document frequency (IDF) within the selected field with regard to all tokens in the document corpus;

temporarily remove those tokens from the first document that have a higher IDF than the selected token;

determine whether the first document describes substantially similar subject matter to the subject matter described by a second document in the document corpus, the second document being organized into a plurality of fields, wherein at least some of the fields include tokens representing subject matter of the second document, and wherein to determine whether the first document describes substantially similar subject matter, the host server is further configured generate a score based in part upon at least one remaining token common to both the first and second documents and to evaluate the score with respect to a threshold value; and provide an indication as to whether the first document describes substantially similar subject matter to the subject matter described by the second document in the document corpus according to the determination.

16. The electronic market place of claim 15, wherein selecting a field of the first document comprises selecting a field according to its likelihood to contain tokens with high IDF values.

17. The electronic market place of claim 16, wherein selecting a field of the first document comprises selecting a field of the group of fields comprising a product number field, a model number field, and a catalogue number field.

18. The electronic market place of claim 17, wherein selecting a field of the first document further comprises selecting a plurality of fields of the first document likely to contain tokens with high IDF values; and wherein select a token from the selected field with the highest IDF with regard to all tokens in the document corpus comprises selecting a token from the selected fields with the highest IDF with regard to a document corpus.

19. The electronic market place of claim 15, wherein the host server is further configured to:

determine the number of tokens in the first document with a higher IDF value than the selected token;

determine whether the number of tokens with a higher IDF value than the selected token exceeds a threshold; and removing those tokens from the first document that have a higher IDF than the selected token only if the threshold is not exceeded.

20. An electronic market place for selling items to consumer over a network, comprising:

a host server including a processor, a memory, and a network connection to a network; and a document corpus comprising a plurality of documents relating to items for sale from a plurality of vendors;

wherein the host server is configured to, upon receiving a first document from a vendor relating to item for sale, the first document being organized into a plurality of fields, and wherein at least some of the fields include tokens representing the subject matter of the first document:

select a field of the first document;

select a token from the selected field, such that the selected token has the highest inverse document frequency (IDF) within the selected field with regard to all tokens in the document corpus;

determine the number of tokens in the first document with a higher IDF value than the IDF value of the selected token;

determine whether the number of tokens with a higher IDF value than the IDF value of the selected token exceeds a threshold; and temporarily remove those tokens from the first document that have a higher IDF than the selected token if the threshold is not exceeded;

identify whether the first document describes substantially similar subject matter to the subject matter described by a second document in the document corpus, the second document being organized into a plurality of fields, wherein at least some of the fields include tokens representing subject matter of the second document, and wherein to identify whether the first document describes substantially similar subject matter, the host server is further configured to generate a score based in part upon at least one remaining token common to both the first and second documents and to evaluate the score with respect to a threshold value; and provide an indication as to whether the first document describes substantially similar subject matter to the subject matter described by the second document in the document corpus according to the determination.

21. The electronic market place of claim 20, wherein selecting a field of the first document comprises selecting a field according to its likelihood to contain tokens with the high IDF values.

22. The electronic market place of claim 21, wherein selecting a field of the first document comprises selecting a field from the group of fields comprising a product number field, a model number field, and a catalogue number field.

23. The electronic market place of claim 22, wherein the host server is further configured to select a plurality of fields of the first document likely to contain tokens with high IDF values and select the token from the selected fields with the highest IDF with regard to all tokens in the document corpus.

24. The electronic market place of claim 22, wherein the threshold comprises a percentage of all of the tokens in the first document.

25. The electronic market place of claim 22, wherein the threshold comprises a predetermined number of tokens.

* * * * *